United States Patent [19]

Iaia, Jr. et al.

[11] Patent Number: 4,831,419

[45] Date of Patent: May 16, 1989

[54] DOCUMENT HANDLER VACUUM BELT PLATEN TRANSPORT CLAMPING SYSTEM

[75] Inventors: Thomas C. Iaia, Jr., Rochester; James A. Herley, Henrietta; Roger C. Male; William J. McLaughlin, both of Fairport; Douglas A. McKeown, Geneseo, all of N.Y.; Robert W. Schaffer, Hanover, N.H.; Robert P. Siegel, Rochester, N.Y.; Charles W. Spehrley, Jr., Hanover, N.H.

[73] Assignee: Xerox Corporation, Stamford, Conn.

[21] Appl. No.: 155,349

[22] Filed: Feb. 12, 1988

[51] Int. Cl.$^4$ .............................................. G03B 27/64
[52] U.S. Cl. .................................. 355/76; 355/145 H; 355/75; 355/312; 271/245; 271/197
[58] Field of Search ................. 355/145 H, 35 H, 76, 355/75; 271/3.1, 6, 245, 197

[56] References Cited

U.S. PATENT DOCUMENTS

| | | | |
|---|---|---|---|
| 3,623,806 | 11/1971 | Short | 355/14 |
| 3,888,585 | 6/1975 | Cross | 355/75 |
| 3,944,366 | 3/1976 | Robertson | 355/76 |
| 4,043,665 | 8/1977 | Caldwell | 355/76 |
| 4,335,954 | 6/1982 | Phelps | 355/14 SH |
| 4,440,492 | 4/1984 | Howard | 355/76 |
| 4,462,527 | 7/1984 | Taylor et al. | 226/15 |
| 4,592,652 | 6/1986 | Henmi et al. | 355/76 |
| 4,618,138 | 10/1986 | Silverberg | 355/145 H |

FOREIGN PATENT DOCUMENTS 60-161752 7/1985 Japan.
871432 2/1987 Japan.

Primary Examiner—L. T. Hix
Assistant Examiner—D. Rutledge

[57] ABSTRACT

A document handler 20 for presenting documents to the platen 23 of a copier 10 for copying with a vacuum belt platen transport system 32 having document transporting belts 35 movable under a substantially planar vacuum plenum backing and imaging background surface 33a overlying the platen, and a vacuum system 33 for applying a partial vacuum to a document sheet being transported by the movable belts over the platen; with a clamping and unclamping system for moving the vacuum plenum backing and imaging background surface 33a against the platen 23 to flatten the belts 35 and a document thereon against the platen for copying. During unclamping the surface 33a slightly fits away from the platen, while supplying the partial vacuum to lift a document away from the platen retained on the belts, by first lifting a first side of the surface 33a up away from the platen substantially before the opposite side, and then subsequently lifting the opposite side, to generate a controlled air flow for assisting in retaining the documents to the belts, and moving the belts when the surface is lifted away from the platen. During clamping the first side of the surface 33a moves towards the platen beginning slightly before the opposite side to generate a controlled air flow expulsion of air.

11 Claims, 5 Drawing Sheets

DOCUMENT HANDLER VACUUM BELT PLATEN TRANSPORT CLAMPING SYSTEM

Hereby cross-referenced, and incorporated by reference, is the copending application of the same assignee, U.S. Serial No. 029,027, now U.S. Pat. No. 4,794,42, entitled "Automatic Dual Mode Sheet and Web Document Transport For Copiers" Filed Mar. 23, 1987 by the same Thomas Acquaviva (sole) (Attorney Docket No. D/86036.

The present invention relates to copier document handling, and, more particularly, to the improved transporting and positioning of documents for copying over the platen of a copier with a vacuum belt document transport system for an automatic document handling system. In particular there is disclosed herein an improved system for rapidly clamping documents from a vacuum transporting position to an imaging position (flattened against the platen) and unclamping the documents into a vacuum transporting position, which overcomes difficulties caused by the vacuum system and maintains control of the documents. There is also disclosed here an improved vacuum belt document transport system, with an improved manifolding system of applying vacuum document retention in a multibelt over-platen vacuum document transport system.

A particular problem with modern copiers with short conjugate optics is maintaining the document being copied sufficiently flat on the imaging platen to avoid optical distortion and to maintain all of the document in focus. This is particularly difficult to compatibly combine with maintaining positional control over the document, especially when rapidly replacing the document with another document to be copied.

The vacuum belt document transport system disclosed herein represents an improvement over the multibelt over-platen vacuum document transport and manifolding system of applying vacuum for document retention thereto of Xerox Corporation U.S. Pat. No. 4,618,138 issued Oct. 21, 1986 to Morton Silverberg. Also particularly noted thereon is Xerox Corporation U.S. Pat. No. 4,294,540 issued Oct. 13, 1981 to R. R. Thettu, although that is a single belt system. Other vacuum aperture/groove patterns in a document transport are disclosed in U.S. Pat. No. 4,544,265 issued Oct. 1, 1985 to E. A. Powers, and Eastman Kodak U.S. Pat. No. 4,412,738 issued Nov. 1, 1983 to D. K. Ahern, et al.

The disclosed system of clamping documents from a transporting position to an imaging position against the platen, and unclamping the documents into a transporting position, is an improvement over various such systems disclosed in prior patents, of which Xerox Corporation U.S. Pat. No. 4,462,527 issued July 31, 1984 to T. N. Taylor et al is of particular interest as disclosing a non-uniform or variable spacing clamp lifting system, as particularly shown in FIGS. 6–8 thereof and its description in Col. 12 lines 35–56, inter alia. As noted there and shown in FIG. 8, the clamp is lifted less near the rear of the platen (the rear document side path guide) by the two different cams of FIGS. 6 and 7. Note also Col. 12 lines 10–14, Col. 13 lines 47–55 and Col. 15 lines 14–46. Tilted lifting of the platen clamp in this reference is described as for a different reason-to prevent a document from climbing over the rear registration edge by keeping that side of that clamp lower. Also, it does not show either belt transport or vacuum control of a document. It shows a frictional and feed wheel document transport with document slippage for registration.

Other document clamping systems for document transports are disclosed in the following patents. They disclose other copier document platen transports in document handlers or feeders in which there is a clamping plate which automatically moves down to flatten the document against the platen for copying, and provide an imaging background surface, and then lifts away to allow document feeding. This art includes Xerox Corporation U.S. Pat. No. 3,888,585 issued June 10, 1975 to T. R. Cross [see esp. FIGS. 6 & 7, and Col. 7, line 39 through Col. 8, line 21];U.S. Pat. No.4,335,954 issued June 22, 1982 to R. L. Phelps [see esp. FIG. 11 & Cols. 9–10]; U.S. Pat. No. 3,944,366 issued Mar. 16, 1976 to D. A. Robertson; and U.S. Pat. No. 3,623,806 issued J. M. Short. They disclose various mechanisms for flattening a document original in relation to a platen. However, many of these also disclose clamps with large wheel apertures, through which feed wheels extend, not belts, and making undesirable holes in the imaging background surface which can cause copy printout defects.

The above U.S. Pat. No. 4,335,954 patent to R. L. Phelps is also of interest as noting at the top of Col. 10 the problem of the vacuum created when the clamp rises. This is addressed there by slots or grooves 190 in in the clamp plate surface preventing all the air from being squeezed out from under the clamp to try to keep the copy on the platen surface after the cam-lifted unclamping. (The opposite of the present system.)

Also noted is an assumed Japanese publication "Koukai Gihoh" No. 87-1432 reportedly published by Fuji Xerox Corp. (their No. FX 19058) on Feb. 20, 1987 in Japan. It discloses a solinoid lifted pressure plate pressing on the inside of a single unapertured document feeding belt over a platen when the belt is stopped. Noted as well is Fuji Xerox Corp. No. FX 16616 Japanese application No. P 60-161752 by K. Yamazaki which was reportedly filed on July 24, 1985 and laid open on Feb. 5, 1987 as Laid Open No. 62-27256. It discloses an eccentric cam driven mechanism for raising and lowering a plural belt document feeder copier platen transport, to press the document against the platen during copying. There is no apparent disclosure of any vacuum system, or non-uniform lifting or clamping.

U.S. Pat. No. 4,592,652 issued June 3, 1986 to K. Henmi, et al, is noted for a movable copier platen clamp, noting especially FIG. 7 which discloses a vacuum and eccentric lifting cams. However, no document transport is provided.

Other background references from other clamp applications include U.S. Pat. Nos. 4,029,404; 4,040,615; and 4,544,265.

In the document clamping system disclosed here, in contrast, an entire vacuum manifold unit is movably mounted above, and carrying, a set of vacuum belts and also pushes them down to clamp a document. The disclosed system relates to clamping and unclamping a vacuum belt transport system. It teaches automatic clamping and unclamping of an entire vacuum manifold/belt unit for each document being fed by the platen transport. The disclosed system maintains the document on a vacuum transport and lifts it away from the platen during unclamping to do so. It has been known in the copier art for many years that a rapid opening of even a simple platen cover can lift a document off of the platen, but this has been considered undesirable, and likely to lose control of it, and the normal solution has been to try to keep the document down on the platen, as noted above, not lifted with the platen cover.

Transporting documents over the platen spaced above the platen glass, as here, is desirable to avoid static generation and attraction to the glass. It also avoids abrasion of any anti-static conductive coatings on the platen glass.

As xerographic and other copiers increase in speed, and become more automatic, it is increasingly important to provide higher speed yet more reliable and more automatic handling of the document sheets being copied, i.e. the input to the copier. It is desirable to feed, accurately register, and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document set precollation copying.

The art of original document sheet handling for copiers has been intensively pursued in recent years. Various systems have been provided for automatic or semiautomatic feeding of document sheets to and over the imaging station of the copier for copying. The documents are normally fed over the surface of an imaging station comprising a transparent platen, into a registered copying position on the platen, and then off the platen. Such automatic or semiautomatic document handlers eliminate the need for the operator to place and align each document on the platen by hand. This is a highly desirable feature for copiers. Document handlers can automatically feed documents as fast as they can be copied, which cannot be done manually with higher speed copiers, thus enabling the full utilization or productivity of higher speed copiers.

A preferable document handling system is one that utilizes an existing or generally conventional copier optical imaging system, including the external transparent copying window (known as the platen or imaging station) of the copier. It is also desirable that the document handling system be readily removable, as by pivoting away, to alternatively allow the copier operator to conventionally manually place documents, including books, on the same copying platen.

Although faster, more accurate, and automatic feeding into and registration of each document at the correct position on the platen to be copied is highly desired, this is difficult to accomplish without document jams or skewing (rotating) the document and/or damaging the edge of the document, particularly as it is being stopped. One problem is that documents can vary widely in sheet size, weight, thickness, material, condition, humidity, age, etc.. Documents may even have curls, wrinkles, tears, "dog-ears", cut-outs, overlays, tape, paste-ups, punched holes, staples, adhesive or slippery areas, or other irregularities. Unlike sets of copy sheets, which generally are all from the same new clean batches and therefore of almost exactly the same condition and size, documents often vary considerably even if they are all of the same "standard" size, (e.g. letter size, legal size, A4, B4, etc.). In contrast, documents even in the same set may have come from completely different paper batches or have variably changed size with different age or humidity conditions, etc.. Furthermore, the images on documents and their fusing can change the sheet feeding characteristics and these images may be subject to damage in feeding if not properly handled, e.g. smearing of fresh typewriting ink. Yet it is desirable to automatically or semiautomatically rapidly feed, register and copy even a mixture of sizes, types, and conditions of documents without document jams or document damage and with each document correctly and accurately aligned to a desired registration position.

One of the most difficult to achieve features for automatic document handling is the rapid, accurate, reliable, and safe registration of each document at the proper position for copying. Conventionally the document is desirably either center registered or corner registered (depending on the copier) by the document handler automatically at a preset registration position relative to the copier platen. At this registration position two orthogonal edges of the document are aligned with two physical or positional (imaginary) registration lines of the copier platen at which the original document is properly aligned with the copier optics and copy sheet/photoreceptor registration system for correct image transfer of the document image to the photoreceptor and then to the copy sheet. This registration accuracy is desirably consistently within approximately one millimeter. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents.

In preferred types of copying systems the document is registered for copying overlying a selected portion of full sized (full frame) platen which is at least as large as the largest document to be normally copied automatically. In such systems the document is preferably either scanned or flashed while it is held stationary on the platen in the desired registration position. That is, in these full frame systems the document is preferably registered by being stopped and held during imaging at a preset position over the platen glass which is adjacent one side or edge thereof.

As shown in the art, and further discussed below, document handling systems have been provided with various document transports to move the documents over the copier platen and into registration. Such document platen transports may comprise single or plural transport belts or feed wheels, utilizing frictional and/or vacuum sheet driving forces. Various combinations of such transports are known with various registration devices or systems. Preferably the same platen transport sheet feeder is used to drive a document onto and off of the platen before and after copying as well as registering the document.

The cited art shows several approaches to registering a document for copying at an appropriate position relative to the transparent copying window. Typically the document is registered on one axis by driving it with a platen transport against a mechanical gate or stop positioned temporarily or permanently at or adjacent one edge of the platen. This is often at or closely adjacent the downstream edge of the platen. That allows unidirectional movement of the document across the platen, entering from the upstream side or edge closely following the proceeding document and ejecting after copying from the downstream side or edge of the platen. The registration gate or stop may comprise projecting aligned fingers, or roller nips, or a single vertical surface along one registration line, against which an edge of the sheet, preferably the leading edge, is driven into abutment to mechanically stop and thereby register the sheet on one axis, in its principal direction of movement. Another function of such mechanical registration is to also deskew the document, i.e., to properly rotate and align it with this registration line as well as to determine and control its registration position. However, such a mechanical gate cannot be interposed in the path of a continuous web document and thus cannot be used for intermediate registration thereof. Also it can sometimes damage the lead edge of a document.

Document registration can desirably be done without mechanical document stops on the platen, as disclosed for example in U.S. Pat. Nos. 4,043,665 issued Aug. 23, 1977 to J. R. Caldwell; 4,132,401 issued Jan. 2, 1979 to J. F. Gauranski, et al; or 4,295,737 or 4,391,505 issued Oct. 20, 1981 and July 5, 1983 to Morton Silverberg,. This can be done by preregistering the document to a platen transport belt and then moving the document a known, preset, distance over the platen on the belt into registration, providing there is no slippage during this entire movement between the document and the belt. Alternatively, this can be done by sensing, on the platen or upstream of the platen, with a document edge sensor, an edge of a document being transported onto the platen. The document is fed over the platen with a non-slip transport driven by a servo-motor or steppermotor which is stopped after a preset time period or movement to stop the document on the platen in the desired registration position. Such a measured-stop registration system, for an RDH, is taught in U.S. Pat. No. 4,579,444 issued Apr. 1, 1986 to T. S. Pinckney and H. J. Sanchez (D/84074), and references cited therein.

In some document handling systems a system for also side registering (laterally positioning) the document on the platen is used, i.e. aligning the original on both axes while on the platen, e.g. U.S. Pat. No. 4,411,418 or 4,335,954. However two axes on-platen registration is not required, and such lateral or second axis registration may be done upstream of the platen, as by confinement of the documents within the side guides in the document tray from which the documents are fed, or driving the sheet against a side guide, e.g. U.S. Pat. Nos. 4,257,587; 4,266,762 or 4,381,893.

In the description herein the term "document" or "sheet" refers to a usually flimsy sheet of paper, plastic, or other such conventional individual image substrate, and not to microfilm or electronic images which are generally much easier to manipulate. It is important to distinguish electronic copying systems, such as the Xerox "9700" printer, which read and store images of documents electronically and create copies by writing on a photoreceptor with a laser beam, or the like, since they do not have the problems dealt with here.

The "document" here is the sheet (original or previous copy) being copied in the copier onto the outputted "copy sheet", or "copy". Related plural sheets of documents or copies are referred to as a "set". A "simplex" document or copy sheet is one having an image and "page" on only one side or face of the sheet, whereas a "duplex" document or copy sheet has a "page", and normally an image, on both sides.

The present invention is particularly suitable for precollation copying, i.e. automatically plurally recirculated document set copying provided by a recirculating document handling system or "RDH". However, it also has applicability to nonprecollation, or postcollation, copying, such as postcollation operation of an RDH or semiautomatic document handling (SADH) as discussed above. Postcollation copying, or even manual document placement, is desirable in certain copying situations, even with an RDH, to minimize document handling, particularly for delicate, valuable, thick or irregular documents, or for a very large number of copy sets. Thus, it is desirable that a document handler for a precollation copying system be compatible with, and alternatively usable for, postcollation and manual copying as well.

Some examples of Xerox Corporation RDH are U.S. Pat. Nos. 4,459,013 issued July 10, 1984 to T. J. Hamlin et al; 4,278,344 issued July 14, 1981 to R. B. Sahay; and 4,579,444, 325 or 326. Some other examples of recirculating document handlers are disclosed in U.S. Pat. Nos. 4,076,408; 4,176,945; 4,428,667; 4,330,197; 4,466,733 and 4,544,148. A preferred vacuum corrugating feeder air knife, and a tray, for an RDH, are disclosed in U.S. Pat. Nos. 4,418,905 and 4,462,586. An integral semiautomatic and computer form feeder (SADH/CFF), which may be an integral part of an RDH, as noted in Col. 2, paragraph 2, therein, is disclosed in U.S. Pat. No. 4,462,527. Various others of these patents, such as U.S. Pat. No. 4,176,945 above, issued Dec. 4, 1979 to R. Holzhauser (Kodak) teach plural mode, e.g. RDH/SADH, document handlers.

The present invention overcomes various of the above-discussed problems, and provides various of the above features and advantages.

A feature of the specific embodiment disclosed herein is to provide, a document handler for presenting documents to the platen of a copier for copying, comprising a vacuum belt platen transport system for feeding the documents over the platen and into an imaging position over the platen, wherein said vacuum belt platen transport system comprises plural document transporting belts movable under a substantially planar vacuum plenum backing and imaging background surface overlying said platen, and vacuum means for applying a partial vacuum to a document sheet being transported by said movable belts over said platen, and means for moving said belts, the improvement comprising clamping means for moving said vacuum plenum backing and imaging background surface against said platen to flatten said belts and a document thereon against said platen for copying said document, said clamping means including unclamping means for lifting said vacuum plenum backing and imaging background surface slightly away from said platen while supplying said partial vacuum with said vacuum means to lift a document away from said platen retained on said belts, for transporting a document with said belts, said unclamping means including means for lifting a first side of said vacuum plenum backing and imaging surface up away from said platen substantially before the opposite side thereof, and then subsequently lifting said opposite side, to generate a controlled air flow for assisting in retaining the document to said belts as said vacuum plenum backing and imaging surface is lifted away from said platen, said means for moving said belts being operable when said vacuum plenum backing and imaging surface is lifted away from said platen and while supplying said partial vacuum with said vacuum means to retain a document against said belts.

Further features provided by the system disclosed herein, individually or in combination, include those wherein said clamping and unclamping means comprises plural cams with different cam rise times connected via cam lifters to lift said first side of said vacuum plenum backing and imaging surface with a different motion than said opposite side by said cams being rotatably driven for clamping and unclamping; wherein said clamping means moves down said first side of said vacuum plenum backing and imaging surface towards said platen beginning slightly before moving down said opposite side of said vacuum plenum backing and imaging surface towards said platen, to generate a controlled air flow expulsion of air out from under said vacuum plenum backing and imaging surface during clamping; wherein said clamping means moves down said first side of said vacuum plenum backing and imaging surface towards said platen beginning approximately 5 milliseconds before moving down said opposite side, with further rotation of said same cams, but beginning said movement of said first side before said opposite side with different said cam rise times configurations of said cams, to generate a controlled air flow expulsion of air out from under said vacuum plenum backing and imaging surface during clamping; wherein said unclamping means, with said rotation of said cams, first lifts said first side of said vacuum plenum backing and imaging surface about 2.5 mm away from said platen while said opposite side remains down in contact with the platen, and then lifts said opposite side about 0.8 mm, and then said vacuum plenum backing and imaging surface is leveled by lifting said opposite side from said about 0.8 mm to about 1.75 mm, and, at approximately the same time, said first side is dropped from said about 2.5 mm to about 1.75 mm; wherein clamping and unclamping is accomplished by common rotation of said cams with different cam profiles providing said different cam rise times, and wherein after said unclamping is at least partially completed a document previously copied is ejected by said platen transport system and a next document is brought over the platen by said platen transport system, while maintaining said vacuum retention of the documents, and then before the copying of this next document it is clamped against the platen by moving down both said first side and said opposite side of said vacuum plenum backing and imaging surface with further rotation of the same cams but beginning the movement of said first side a fraction of a second before the movement of said opposite side to move said surface down at an angle towards said platen which squeeges out air from under the document before the final clamping, in which both said first and said opposite sides are flattened against said platen; and wherein additional vacuum retention means connecting with said vacuum means are provided along said first edge of said vacuum plenum backing and imaging surface to provide a substantially higher partial vacuum holding force to the edge area of a document overlying said first edge for resisting stripping of the document from said vacuum belt platen transport during said unclamping lifting movement.

Further disclosed features include a copying method utilizing a document handler for presenting documents to the platen of a copier for copying, comprising a vacuum belt platen transport system for feeding the documents over the platen and into an imaging position over the platen, wherein said vacuum belt platen transport system comprises plural document transporting belts movable under a substantially planar vacuum plenum backing and imaging background surface overlying said platen, and vacuum means for applying a partial vacuum to a document sheet being transported by said movable belts over the platen, and means for moving said belts, comprising the steps of:

clamping said vacuum plenum backing and imaging background surface against the platen to flatten said belts and a document thereon against the platen for copying said document by unevenly moving said vacuum plenum backing and imaging background surface and said belts down towards said platen, unclamping said vacuum plenum backing and imaging background surface and said belts and a document thereon from said platen by unevenly lifting said surface away from said platen while supplying a partial vacuum with said vacuum means to lift a document away from said platen retained on said belts, said unclamping including lifting a first side of said vacuum plenum backing and imaging surface up away from said platen substantially before the opposite side thereof, and then subsequently lifting said opposite side, to generate a controlled air flow for assisting in retaining the document to said belts as said vacuum plenum backing and imaging surface is lifted away from said platen, and transporting a document with movement of said belts and with said partial vacuum retaining a document against said belts after said unclamping is at least partially completed.

Additional features, individually or in combination include those wherein said clamping moves down said first side of said vacuum plenum backing and imaging surface towards said platen beginning slightly before moving down said opposite side of said vacuum plenum backing and imaging surface towards said platen, to generate a controlled air flow expulsion of air out from under said vacuum plenum backing and imaging surface during clamping; wherein said unclamping first lifts said first side of said vacuum plenum backing and imaging surface about 2.5 mm away from said platen while said opposite side remains down in contact with said platen, and then lifts said opposite side about 0.8 mm, and then said vacuum plenum backing and imaging surface is leveled by lifting said opposite side from said about 0.8 mm to about 1.75 mm, and, at approximately the same time, said first side is dropped from said about 2.5 mm to about 1.75 mm; wherein said clamping and unclamping is accomplished by rotation of cams with different cam profiles, and wherein after said unclamping is at least partially completed a document previously copied is ejected by said platen transport system and a next document is brought over the platen by said platen transport system, while maintaining said vacuum retention of the documents, and then before the copying of this next document it is clamped against the platen by moving down both said first side and said opposite side of said vacuum plenum backing and imaging surface with further rotation of the same cams but beginning the movement of said first side slightly before said opposite side to move said surface down at an angle towards said platen which squeegees out air from under the document before the final clamping, in which both said first and said opposite sides are flattened against said platen.

Some examples of various other prior art copiers with document handlers, and especially with control systems therefor, including document sheet detecting switches, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215;

4,229,101; 4,278,344; 4,284,270, and 4,475,156. It is well known in this art, and in general, how to program and execute document handler and copier control functions and logic with conventional or simple software instructions for conventional microprocessors. This is taught by the above and other patents and various commercial copiers. Such software may vary depending on the particular function and particular microprocessor or microcomputer system utilized, of course, but will be available to, or readily programmable by those skilled in the applicable arts without experimentation from either descriptions or prior knowledge of the desired functions together with general knowledge in the general software and computer arts. It is also known that conventional or specified document handling functions and controls may be alternatively conventionally provided utilizing various other known or suitable logic or switching systems.

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below. The present invention will be better understood by reference to this description of this embodiment thereof, including the drawing figures (approximately to scale), wherein.

Figure 2:
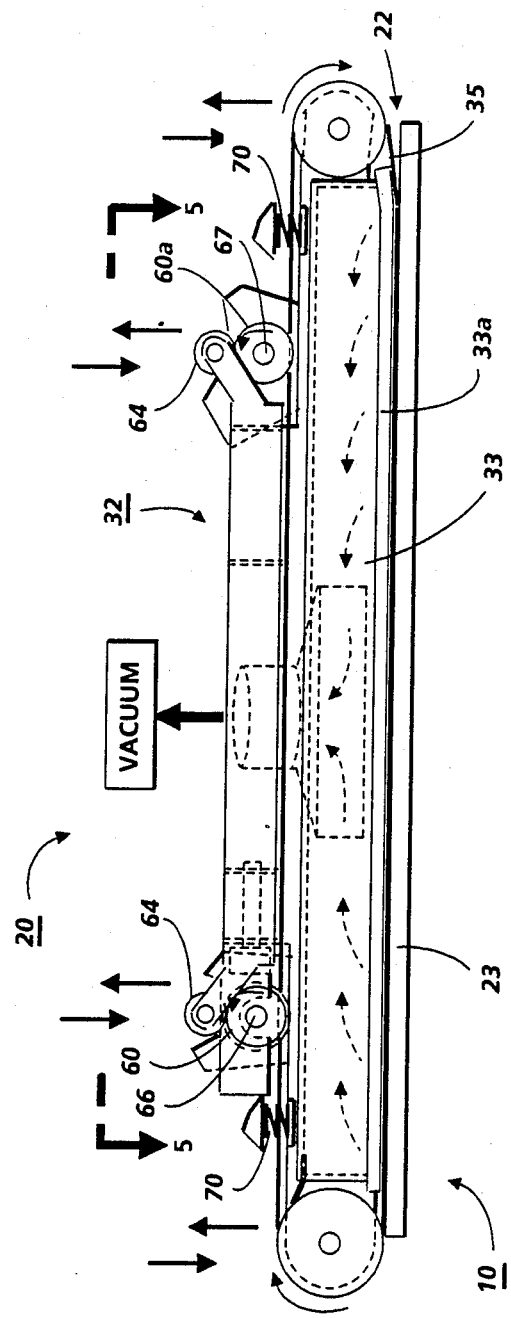
FIG. 2 is a partial side view of the document handler of FIG. 1 illustrating the clamping and unclamping system of the platen vacuum belt transport.
Figure 3:
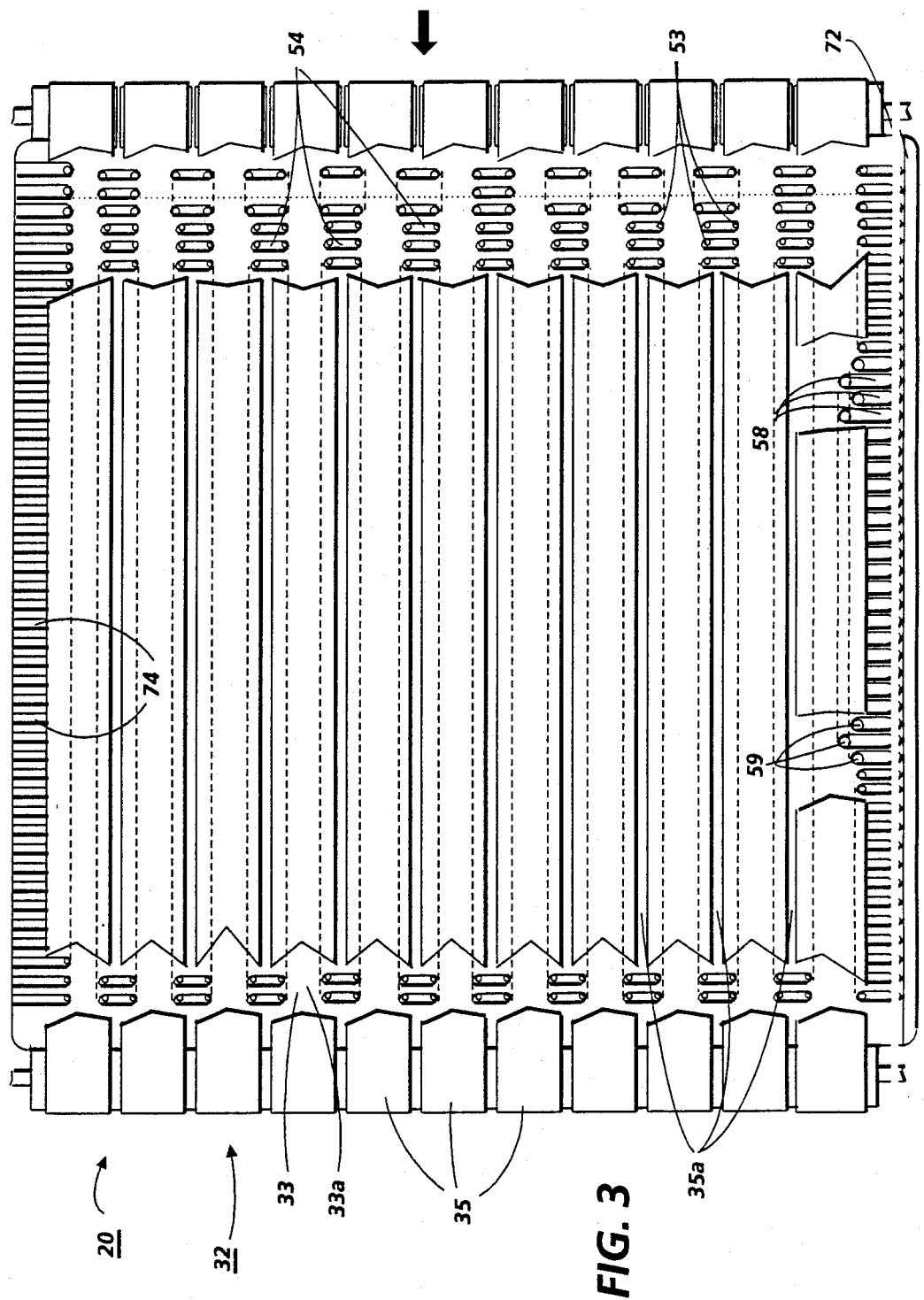
FIG. 3 is a bottom view of the platen transport of the document handler of FIGS. 1 and 2 with the belts shown partially broken away to better illustrate the underlying vacuum manifold surface grooves and mating apertures patterns with relation to the overlying document transport belts.
Figure 4A:
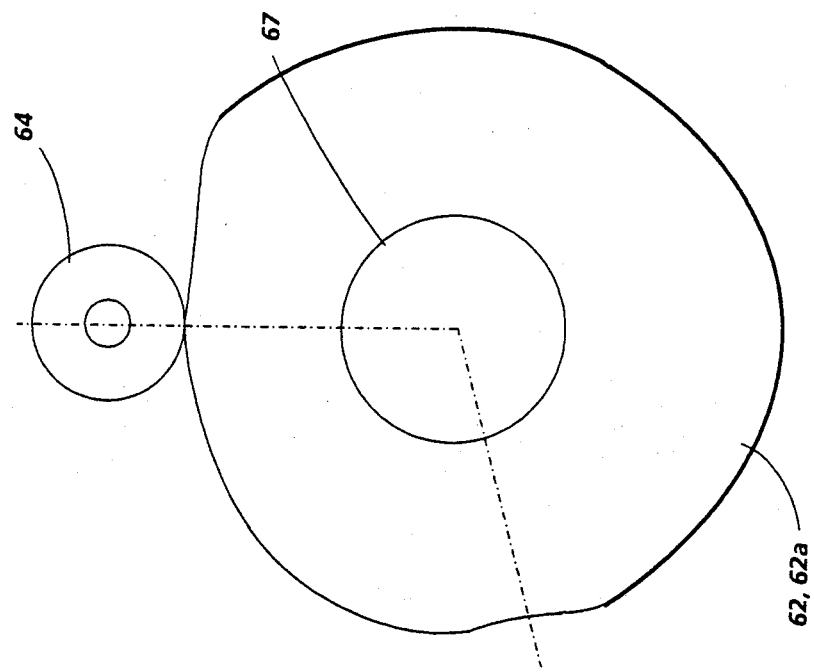
Figure 4:
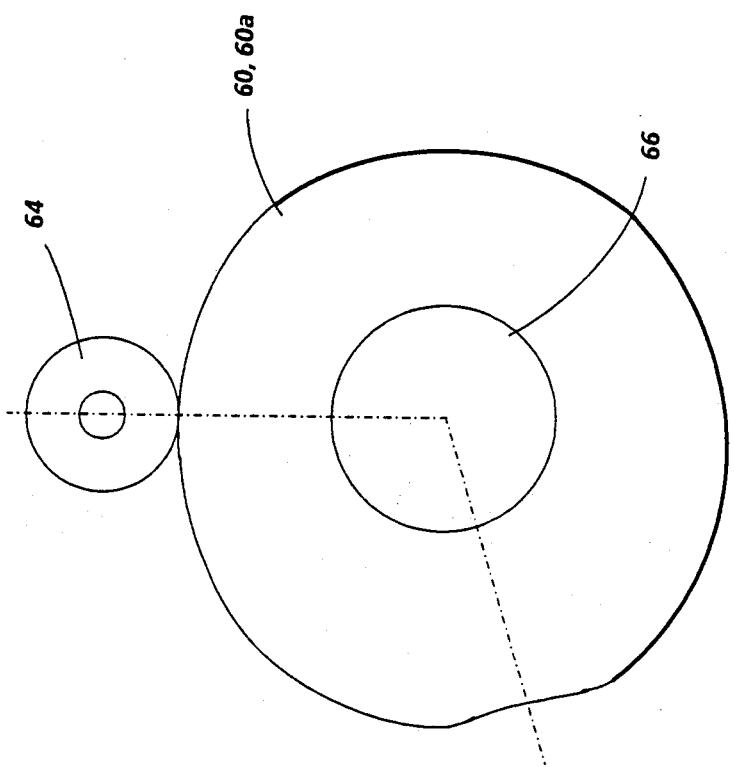
Figure 5:
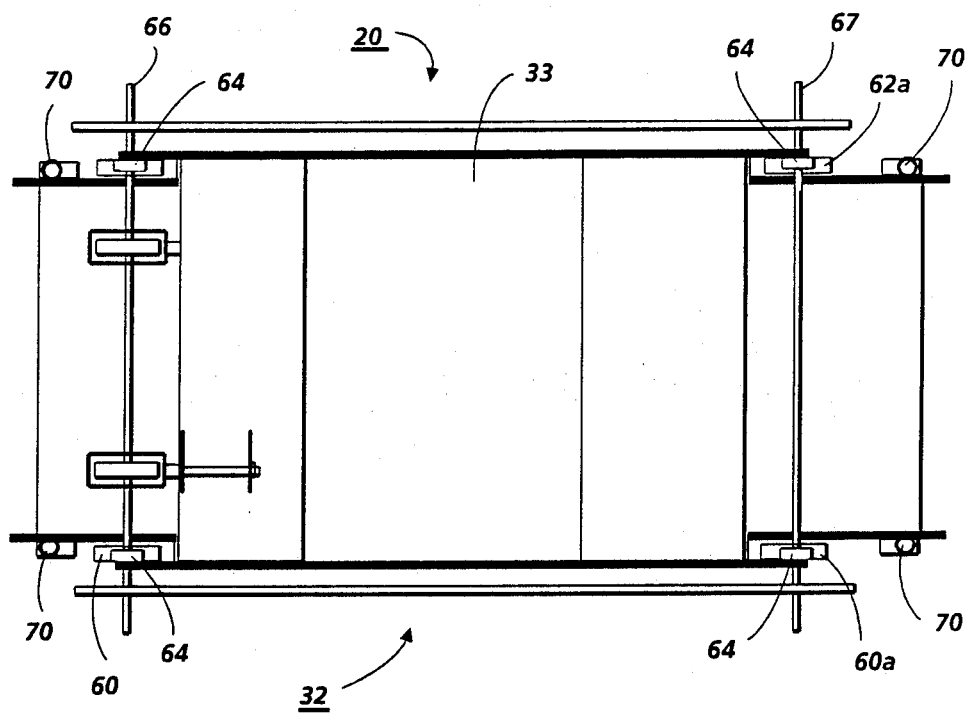
Figure 6:
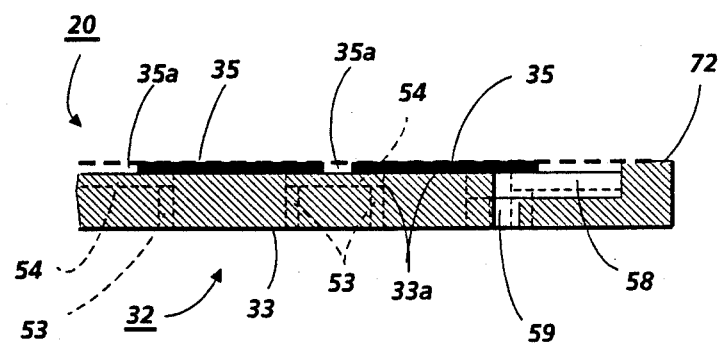

FIGS. 4 and 4A respectively show enlargements of the profiles of the front and rear lifting cams of the clamping and unclamping system illustrated in FIGS. 2 and 5;

FIG. 5 is a schematic partial top view of the clamping and unclamping system of FIG. 2, further illusrating the operation of the cams shown in FIGS. 4 and 4A; and FIG. 6 is an enlarged partial cross-sectional view of the rear registration edge area of the platen transport vacuum manifold surface and belts of FIG. 3 (Note that this Figure is "upside down" from the actual orientation because FIG. 3 is a bottom view.)

Figure 1:
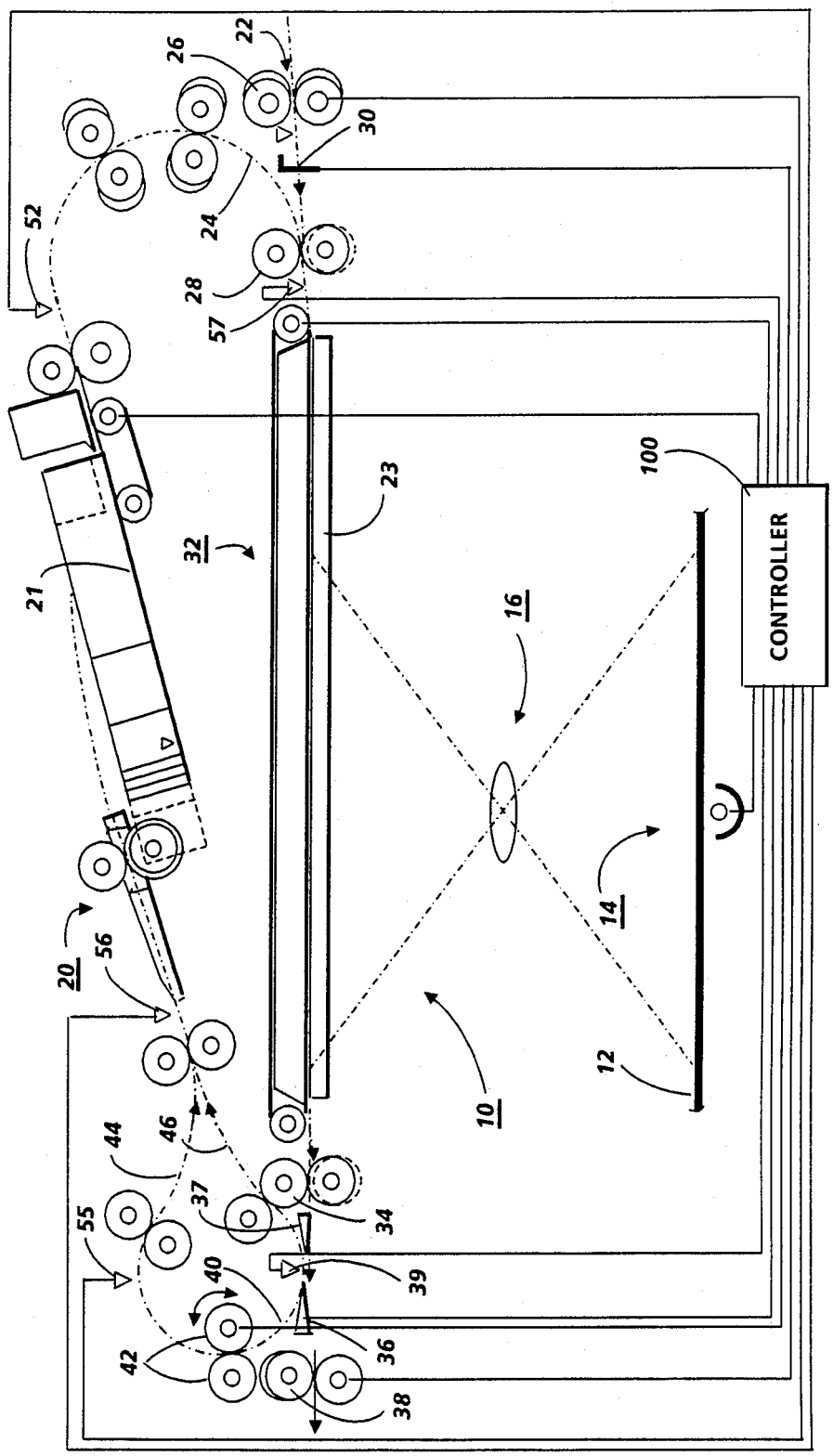
FIG. 1 is a side view of an exemplary recirculating but plural mode document handler for a copier, as shown in the cross-referenced application, in which the system of the invention may be incorporated as shown in the other Figures.

Describing now in further detail the example illustrated in the Figures, there is partially schematically shown in FIG. 1 an exemplary copier 10, with an exemplary document handling system 20 (preferably a plural mode RDH, to be described herein). The copier 10 may be of any known type, such as those disclosed in above-cited copier patents. The exemplary DH 20 illustrated here is similar to that shown in the above cross-referenced U.S. Ser. No. 029,027, or the generally comparable disclosures in U.S. Ser. No. 029,026, both filed Mar. 23, 1987. However the system disclosed herein is applicable to various other DH's, such as those shown in various above-cited patents thereon. As shown therein, it is previously known to have two separate document inputs, a recirculating or RDH input stacking tray 21, and a side entrance 22 for semiautomatic document handling (SADH), into which documents may be individually inserted by the operator, sequentially and/or in an operator selected "job interrupt" mode.

The RDH 20 provides for automatically transporting individual registered and spaced document sheets onto and over the conventional platen imaging station 23 of the copier 10, using a vacuum belt platen transport system 32 overlying the platen 23. Documents are inputted to one end of the platen transport 32 either from the RDH input provided by the restacking tray 21 on top of the unit, spaced above the platen, or from the separate document input 22 directly adjacent one side of the platen, shown at the right side here.

As is conventionally practiced, the entire document handler unit 20 pivotally mounts to the copier 10 so as to be liftable by the operator up away from the platen for manual document placement and copying or jam clearance of documents jammed in the platen area. The DH 20 has conventional external covers (not shown, for drawing clarity).

Other than the DH 20 system modifications and controls and other features to be described herein, the exemplary copier 10 may be, for example, the well known "Xerox" "1075" or "1090" or any other xerographic or other copier, as illustrated and described in various patents cited above and otherwise, including U.S. Pat. No. 4,278,344 and others. The exemplary copier 10 may conventionally include a photoreceptor belt 12 and the conventional xerographic stations acting thereon for respectively charging, image exposing at 14, image developing, etc.. Documents on the platen 23 may be imaged onto the photoreceptor 12 at area 14 through a variable reduction ratio optical imaging system 16 to fit the document images to the selected size of copy sheets. The copier 10 is preferably adapted in a known manner to provide duplex or simplex precollated or postcollated copy sets from either duplex or simplex original documents copied from the RHD 20.

The control of all sheet feeding is, conventionally, by the machine controller 100. The controller 100 is preferably a known programmable microprocessor, exemplified by the previously cited art. The controller 100 conventionally controls all of the machine steps and functions described herein including the operation of the document feeder 20, the document and copy sheet gates, the feeder drives, etc.. As further taught in those references, the controller 100 also conventionally provides for storage and comparison of the counts of the copy sheets, the number of documents recirculated in a document set, the desired number of copy sets and other selections by the operator through the panel of switches thereon, time delays, jam correction control, etc.. The controller 100 may be conventionally connected to receive jam and control signals from various conventional document sheet sensors mounted in the document recirculation path of the RDH, including those shown in the respective locations shown here in the Figure, including 39, 52, 55, 56, and 57.

Referring further to the exemplary plural mode document handling system 20 illustrated in FIG. 1, documents may be fed to the same platen 23 and platen transport 32 input position from either the SADH input 22, or from the RDH tray 21. The latter input is through an RDH input path 24 between that tray 21 and the upstream end of the the platen transport 32, preferably including, as shown, a known stack feeder/separator, a sensor 52, and a first set of turn baffles and feed rollers to invert the documents before copying. The SADH input 22 may conventionally include a tray and edge guide and sensors and an SADH preregistration gate 30. This gate 30 may have any of the various configurations and operating mechanisms illustrated in various of the above-noted prior art references on registration gate systems. The gate 30 illustrated here is preferably retractable in and out of the SADH input path to the platen from the SADH input 22 by solenoid actuation controlled by the controller 100. The SADH input path feeds in documents directly to the platen, without inversion, and bypassing, without interference, the RDH input path 24, so that the two inputs can automatically operate in a selected interleaved or interrupt feeding sequence.

The SADH input 22 here preferably also includes slightly skewed cross-rollers 26. As taught in the above-cited U.S. Pat. No. 4,579,444, these provide side edge registration towards a rear edge guide at this input, as well as feeding of the document forward for registration and deskewing against the gate 30. Such cross-rollers may also be provided in the RDH input path 24. Just downstream of the gate 30 are take-away or on-platen rollers 28 providing a document sheet feeding nip for engaging and transporting any document sheet which is past the gate 30 or the RDH input path 24. The rollers 28 feed the documents directly past sensor 28 into the input to the platen transport system 32.

The platen transport system 32 here comprises a vacuum manifold 33 for holding documents against plural belts 35 engaging and transporting the documents without slippage over the platen 23 into the desired registration position, of the general type disclosed in the above-cited U.S. Pat. No. 4,618,138. The platen transport system 32 and the rollers 28 may be incrementally servo motor driven by the controller 100 in a manner taught by various of the above-cited references.

After the documents are copied on the platen 23, they are, in this example, ejected by the platen transport system 32 into downstream or off-platen rollers 34 and fed past a gravity gate 37 and sensor 39 to a decision gate 36. If the gate 36 is up (it always is for CF or normal SADH copying) it deflects the documents directly to an SADH document output including output rollers 38. If the decision gate 36 is down, as for RDH, and for job recovery here, sheet documents are deflected into an RDH return path 40, past sensor 55. However, this RDH return path 40 includes reversible rollers 42 to provide a choice of two return paths to the RDH tray 21; a simplex return path 44 with an inversion, or a duplex return path 46 without an inversion. For the duplex path 46 the rollers 42 are reversed to reverse feed the previous trail edge of the sheet back to the now-dropped gate 37 which now deflects that sheet into the path 46. The duplex return path 46 provides a desired circulation inversion of duplex documents, as returned to the tray 21, for copying their opposite sides in a subsequent circulation, or circulations, as described in the above-cited art. This is because a duplex document returned through the duplex return path 46 has only one inversion per circulation (in the RDH input path 24). In contrast, in the complete simplex circulation path there are two inversions per circulation, one in each of the paths 24 and 44, which equals no inversion per circulation. Thus, simplex documents are always returned to tray 21 in their original, face up, orientation.

As illustrated, the RDH tray 21 here also includes a variable position rear registration edge or backstop, illustrated here with several dashed lines, for initially accommodating and restacking various sizes of documents. The illustrated DH system 20 utilizes for its RDH feeding a known combined corrugated vacuum feeding and air knife separator system for feeding out sequentially the bottom-most sheet of the stack in the tray 21, as described in various of the above-cited references.

For normal cut sheet SADH input 22 document feeding in the DH system 20, the documents are fed and controlled by, in order, the cross-rollers 26, the nips of the on-roll rollers 28, the platen vacuum belt transport 32, the nips of the downstream or off-roll rollers 34, and then the nips of the output or exit roll rollers 38. For RDH circulation the sheets are additionally driven and controlled by the stack feeder/separator and the rollers and curved baffles in the paths 24 and 44 or 46, and the eject rollers at the restack entrance at the rear of the tray 21, as illustrated. Individual sheets are "handed off" from one feeding nip to another along the document path with very restricted slippage to ensure positive and registered feeding.

In the system illustrated here, the portions of all the roller pair units 26, 28, 34 and 38 which are below the document path are idler rollers mounted to the body of the copier. All the above-path rollers in each of these nip pairs are driven rollers, and all of those are mounted to the pivotal platen cover unit of the DH system 20. Thus, these above-path rollers may all be lifted up, away from the platen 23, to expose it and to open all these roller nips and the platen transport 32.

Turning now to details of the exemplary system disclosed herein, there is disclosed an improved platen transport system for copier, with features as previously described above in the introduction. The clamping and unclamping system disclosed here overcomes particularly difficult document handling problem in modern copiers with short conjugate optics providing a narrow depth of field calling for reliable document flattening against the platen with a very planar clamping surface, yet being compatible with high speed document handlers requiring rapid document platen exchange times. That is especially critical and difficult with vacuum transports, as discussed further herein.

Here, as the clamp lifts, the inrush of air is controlled so as not to strip the sheet from the vacuum platen transport 32, and preferably to help lift and hold the sheet against the transport 32 instead. This is provided by lifting the clamp first at the registration edge, where the sheet is controlled. As this first edge lifts, inrushing air assists in lifting the rest of the sheet. Here, as the clamp closes, the clamping pushes the entire platen transport 32, and therefore the document held on it, towards the platen glass at an angle, pushing air aside. Clamping and unclamping can be achieved in 120 milliseconds or less with this system yet maintain document control.

As noted, most of the above references teach clamps with apertures through which feed wheels extend, making undesirable holes in the imaging background surface which can show up as black areas on the copy sheets, and clearly being unsuitable either for a vacuum or a belt system.

The moving clamp system here includes the external integral bottom surface 33a of an entire moving vacuum manifold 33 above a set of belts 35, which surface 33a pushes the belts 35 down against the document for clamping. I.e. the entire vacuum belt feeder unit 32, including the manifold 33, its surface 33a, the belts 35 and their mounting frame and rollers, etc. moves up and down relative to the platen to provide automatic clamping and unclamping. The belts 35 press the document flat against the platen 23 because the surface 33a underlying them holds the belts flat. As will be described, the document lifting movement required for the unclamping is difficult to achieve here because the clamp is lifting against the vacuum forces formed between the sheet and the platen glass. This vacuum is formed as a result of greatly increasing the volume between them during lifting.

The bottom or clamping surface 33a is generally planar, but channeled or grooved 54, and apertured 53 into the manifold or plenum 33 interior, for vacuum application to the document in the gaps 35a between the belts 35, as will be described. The frame of the manifold unit 33 here also provides belt supports, such as those further described in the above-cited U.S. Pat. No. 4,618,138 issued Oct. 21, 1986 to M. Silverberg. The clamping surface 33a also preferably has a preset, preformed, concave "bow", to assist or insure flattening, of about 1 mm (millimeter) to 0.5 mm when not engaged. That is, the unstressed (unclamped) surface 33a preferably has a large radius concave "belly", with the center of surface 33a about 0.5–1.0 mm further away from the platen than the outer edges of surface 33a, to insure that this surface 33a presses flat against the platen. That is assisted by the illustrated springs 70 pressing down the outer corners of the frame holding the manifold 33 against the platen, except when the clamp is lifted. That is, the unit 32 is spring-loaded down. The "bow" also helps insure maximum document flattening at the document edges, where it is most optically sensitive. This "bow" or "belly" centerline is preferably approximately alligned with the centerline of the lens system where document spacing and distortion is the least sensitive. Also, it helps provide for a small volume of air during clamping between the document sheet and the glass to aid document unclamping by reducing vacuum holddown forces.

As shown in FIGS. 2 and 5, the unit 32 is lifted up against the spring force by lifting 4 cam followers 64 by rotation of 2 pairs of cams 60, 60a and 62, 62a, on two fixed camshafts 66, 67, which are servo driven, to provide the following unique movements to overcome the vacuum/air flow problems: First the rear or side registration edge of the clamp surface 33a is lifted by the rear cams 62, 62a by about 0.1 inch (2.5 mm), to allow air to get under the clamp there first. Then the front cams 60, 60a lift the front or operator side of the clamp (the side opposite the redge edge) up by about 0.03 inch (0.8 mm). Then the belts 35 drive may be started, and the rear edge is dropped down by the rear cams from said 2.5 mm to about 1.75 mm while raising the front edge from said 0.8 mm to said 1.75 mm to level it. Note the document sheet feeding may be started during this special small but irregular unclamping movement of the clamp.

The configurations or profiles of the two identical front cams 60, 60a are shown in FIG. 4, and those of the two identical rear cams 62, 62a are shown in FIG. 4A. FIGS. 2 and 5 show how these four cams move their cam followers 64, which directly translate the varying cam profiles into an equal movement of the entire platen transport unit 32. All the cams may be commonly rotated at the same velocity and by the same rotation angle between two common (dashed Line) dwell angles for the final up and down (unclamped and clamped) positions. The clamping position is not critical for the cams because the springs 70 and gravity can do the actual or final clamping. The radii of all the cams at the two dwell points for the clamped and unclamped positions may be the same, but the intervening profiles of the rear cams differ substantially from those of the front cams, as shown in FIG. 4 vs FIG. 4A. There may be less than approximately 2.6 mm between the largest and smallest radii of the exemplary cams here. That represents the maximum possible difference between the raised and lowered positions of the lower surface 33a for these cams in this configuration. Note, however, that the angular positions at which the rear cams reach their maximum radius is very different from that of the front cams. I.e., the cam rise and fall is very different for the front cams vs. the rear cams.

As the clamp lifts in this described manner, the surface 33a and the document sheet thereon "wave" upwardly from the rear or registration edge, rather than lifting straight up uniformly. This provides a desirable and controlled airflow pattern as the clamp is lifted.

Cooperating therewith are additional vacuum grooves 58 and vacuum apertures 59 along the rear registration edge of the surface 33a. Note particularly FIG. 6. These additional apertures 59 and grooves 58 increase the vacuum retention of that edge of the document against the transport, resisting the airflow in that area as the clamp lifts. Note that the pattern or spacing of the apertures 59 and their communicating corresponding channels or grooves 58 is denser, i.e. they are both larger and closer together than the other apertures 53 and grooves 54 on the surface 33a. These rear edge grooves 58 are substantially deeper, e.g. approximately 8 times deeper, so as to apply a much higher vacuum force to this rear registration edge of the document between the last belt 35 on that side and the registration edge. Because these rear edge vacuum apertures 59 are much larger in diameter and closely spaced, they are manufactured in the staggered pattern illustrated in FIG. 3 rather than arranged linearly as the other groups are.

Further noting FIG. 6, additionally provided along the rear or registration edge of the surface 33a is a raised edge or rib seal 72 extending along the rear edge of bottom plate 33a. The rib 72 height is approximately the same as the belt 35 thickness. This rib seal 72 is preferably approximately 0.25 mm high and 6 mm wide, and terminates and seals the outer ends of the edge grooves 58. Therefore a confined or defined vacuum chamber is provided between the rear edge of the rearmost belt 35 and this rib 72, forming a substantially higher intensity vacuum under the outer edge of the document sheet. Note that the outer edge of the document is always overlying this high vacuum area and at least partially overlying the rib 72, because most documents fed by this document handler 20 are registered to the rear registration edge, which is directly over or immediately outside of the rib 72. That rear registration edge is not physically present in the platen area here but may be provided by pre-registering the rear edge of the document, to a line adjacent the outside edge of the rib 72, immediately upstream of the platen transport, by an edge registration guide provided in the document path there from both the RDH and SADH inputs, against which the rear edge of the document may be driven by crossed rollers, as described in the above cited patents. Thus, the rear edge of most sizes of documents are always lying on and sealing this rib seal 72, not inside thereof, and not extending substantially beyond this rib 72. The rib 72 also reduces document distortion at the top edge area where that is most sensitive.

Alternatively to the plural additional vacuum grooves 58, a single shallow flat bottomed channel (e.g., 4 mm wide by 0.5 mm deep, below the rib 72) can be provided extending along and parallel to and just inside the rib 72, i.e. extending in the direction of document motion, so as to be closed by an overlying document. In FIG. 6 it could appear substantially the same as present FIG. 6 except that at reference 58 the solid line would be where the lower dashed line is now.

It will also be noted that an additional groove or channel pattern 74 may be provided at the front edge of the surface 33. However these grooves 74 are only functionally utilized in the case of very large (very long) documents which would extend out over these grooves 74.

As the clamp lifts in the manner described, the surface 33a and the document sheet thereon "wave" upwardly, starting from the rear registration edge, rather than lifting straight up uniformly. The rear registration edge of the document, which is held with extra vacuum force as described above, is lifted first. The additional vacuum grooves 58 and vacuum apertures 59 along the registration edge vacuum retain the document edge against any peeling or separating tendency caused by the airflow entering there as the clamp lifts. Note that it would be undesirable to apply such a large vacuum retention force for the entire document. That would have several disadvantages, including increased drag forces of the belt and document against the surface 33a, and possible wrinkling of thin documents.

Turning now to the clamping operation and movement, this differs considerably from the above described unclamping movement, even though here it is accomplished by further movement of the same cams. For clamping, the extent and direction of motion of the front and rear edges of the surface 33a may be the same, but preferably the rear or registration edge starts to drop about 5 milliseconds before the front edge. Thus an air squeegeeing action occurs during clamping, in which air is squeezed out from under the clamp toward the front during clamping. Thus the rear or registration edge will contact the platen first, although the movement of both the front and rear edges of the surface 33a is decelerated before the platen is engaged. Both front and rear ends of the clamp can be moved down at about the same velocity until this deceleration occurs, shortly before the contact of the rear edge. Then after the rear edge contacts, the continued rotation of the cams flattens both the front and rear edges of the surface 33a with equal force against the platen. This wave or squeegeeing of the document down during the clamping movement helps to keep lightweight documents from being wrinkled by the belt transport by overpressure by trapped air pockets under the document against which the thin document would be forced, i.e., localized undersired air pressure against the document which could cause buckling or wrinkling of a thin document.

To summarize the motions during unclamping, the rear edge is first lifted about 2.5 mm while the front edge remains down in contact with the platen. Then the front edge is lifted to about 0.8 mm. Then the belts may be started, since there is enough air available to provide adequate vacuum retention and therefore nonslip transport. Then the clamp is leveled by lifting the front edge from 0.8 mm to 1.75 mm and, at the same time, the rear edge is dropped from 2.5 mm to 1.75 mm. The document previously copied is ejected by the platen transport and the next document is brought over the platen by this platen transport, maintaining vacuum retention at all times. Then before the copying of this next document it is clamped against the platen by moving down both front and rear edges of surface 33a with further movement of the same cams but beginning the movement of the rear about 5 milliseconds before the front to move the clamp down at an angle which squeegees out air from under the document before the final clamping in which both edges are against the platen.

To summarize the exemplary motion drive disclosed herein, as shown in FIGS. 2 and 5, the four cams are on two driven shafts mounted to the frame of the entire DH unit 20 and therefore rotating about fixed axes in normal operation (ie, unless the entire DH 20 is lifted up from the platen). The four conventional cam followers 64 are each positioned directly above the 4 cams, to be lifted in proportion to the cam profile or radii and angle of rotation. The cam followers 64 are fastened to a rigid support frame fastened to and holding the vacuum plenum, and preferably the belts. This movement from the cam profiles is thereby transmitted directly to the platen transport unit 32, including surface 33a. In addition to gravity, the 4 springs 70 between the DH 20 frame and the frame of the platen transport unit 32 act to press the latter down, and also hold the cam followers 64 down against the cams and assist rapid downward (clamping) acceleration. Note that this clamping and unclamping must occur at the document exchange rate, which is equal to or one-half of the full copying rate of the copier.

To hold the platen transport in position horizontally yet allow vertical unclamping movement relative to the cams and the cam shafts, there are illustrated here in FIG. 5 additional cylindrical bearings on the cam shafts 66, 67, and mating confining bearing retainers on the unit 32 allowing vertical movement but not horizontal movement. Mating pins, guides, slide plates or other retainers could be used.

Here, in a document feeder 20 for transporting document sheets over the platen of a copier with a vacuum belt platen transport system 32 with means for stopping the document sheet at an imaging position on the platen, the vacuum belt platen transport system 32 comprises plural white opaque belts 35 moving under a white vacuum plenum backing surface overlying the platen, and includes a conventional vacuum source for applying a partial vacuum to a document sheet being transported by the moving belts. The belts 35 are preferably thin, low-frictional, non-elastomeric, plastic belts as in said U.S. Pat. No. 4,618,138, but not translucent or transparent, because the belts 35 are optically masking vacuum holes 53 and 59 here. (Said U.S. Pat. No. 4,618,138 also disclosed white belts in Col. 9 lines 59–60.) The belts 35 are unapertured and the exposed area of the vacuum plenum clamping and backing surface 33a is unapertured in the imaging position, so that the vacuum belt transport system is effectively invisible to the copier. That is, the apertures 53 here extend in rows over most of the surface 33a, but only underlying the edges of belts 35.

As observed in various references, multiple belt transports have often had very serious "printout" or copy defect problems with "show-around" and "show-through". "Show-through" is the printing out of dark areas on the copy sheet because the copier optics "sees" dark areas on the document transport through the document, particularly through a transparent or very thin or otherwise translucent document. "Show-around" can occur when the document is mis-registered, or a reduction copy is being made, which directly exposes areas of the platen transport beyond (outside of) one or more edges of the original. Both of these types of copy defects are particularly likely with vacuum platen transports and plural belt platen transports, because the belt edges and vacuum apertures tend to have both printable edge shadows and dirt contamination (visible darkening), particularly if such belts are of a relatively thick or high friction elastomeric material. This can produce very undesirable dark areas on the copy sheets.

Vacuum belt transports desirably provide a combination of non-critical frictional feeding by the belt(s) assisted by a partial vacuum applied through apertures in the belt or between the belts to retain or pull the document or portions thereof against the belt(s), as taught in the cited art. However, vacuum belt transports have introduced serious additional problems of "show-around" and "show-through" copy defects. Undesirable dark background markings on the copy sheets can occur from images of light absorbed in the vacuum apertures in or for the belt(s) or in the underlying vacuum manifold or plenum surface for the belt(s).

The platen transport system 32 here includes a vacuum plenum or manifold 33 having a novel white backing or imaging surface 33a closely overlying the platen 23, as will be further described. This plenum backing surface 33a is closely overlayed with a plurality of driven transport belts 35, spaced apart by relatively narrower defined gaps 35a. The belts 35, spaced apart by relatively narrower defined gaps 35a. The belts 35 are each relatively narrow endless loops. These belts 35 may be, for example, uniformly made from a single layer of commercially available polyester material. They are preferably much less than ½ mm thick, and a thickness of only approximately 0.2 mm has been found to be operative and desirable, as disclosed in the cited U.S. Pat. No. 4,618,138.

The lower or outer (document transporting) surface of the belts should be sufficiently smooth so as to resist the accumulation of contaminants such as paper lint thereon, and so as to maintain the preferred invisibility of the belts to the copier. If desired, some belt surface texturing may be provided for vaccum migration across the belt.

Vacuum is applied to the document in the transport system 32 via the surface 33a in the gaps 35a between the belts. This vacuum holds a document sheet against the belts 35 with sufficient force that the low friction engagement of the moving belts 35 against such a vacuum-retained document provides an adequate transporting force. That is, sufficient normal force between the sheet and the belts 35 such that even with the low coefficient of friction of the belts there is sufficient forward transporting force to reliably transport the document with minimal slippage from the initial engagement of the document upstream (off of) the platen, then across the platen towards the downstream edge thereof, i.e., towards and into the forward edge registration position, and then to eject the document from the platen after it has been registered and copied. The applied vacuum also helps to retain or lift up the document sheet thereon out of substantial engagement with the platen during feeding (while unclamped), thereby reducing frictional resistance to feeding and static electricity generation between the document and the platen. (Conventional conductive brush or pin coronode or other electrostatic discharge means may be provided for the documents, the belts and/or the platen, if desired).

The conformable mounting of the platen transport system 32 over the platen may be variously provided. As previously described, preferably, the entire platen transport system 32, comprising the vacuum plenum 33, its imaging surface 33a, the belts and their supports, and all of the components directly attached thereto, are mounted for a slight but controlled independent movement relative to the rest of the document handling system 20, i.e., relative to the cover and the frames of the DH system 20 which support the platen transport system 32. It is mounted so as to be able to conform to the platen surface when clamping. Limited axially deformable coil springs 70 or the like may be provided at the four corners of the upper surface of the vacuum plenum or its mounting frame. The mounting of the platen transport system 32 to the frame of the document handling system 20 allows independent vertical movement of the platen transport but prevents its lateral movement and therefor maintains lateral registration of the transport and registration system. It allows the imaging surface of the platen transport and the belts thereon to closely conform to the plane of the upper surface of the platen during clamping.

The bottom wall 33a of the vacuum plenum 33, providing the imaging surface, is formed with sufficient stiffness so as to maintain the flatness of that surface. This may be assisted by stiffening ribs or corrugations on the interior surface thereof. It may also have a preset bow as described.

The inside surfaces of the lower flights of the belts are supported by and slide over especially designed portions or areas of the backing surface 33a of the plenum 33. Here it is important to note from FIG. 3 that these areas are largely ungrooved, to avoid applying vacuum under the belts and thereby substantially reduce belt friction with surface 33a. The opposite ends of each belt loop are mounted on rollers at opposite ends of the platen transport system 32.

Turning now to the vacuum system for the platen transport system 32, the vacuum source may be provided by a conventional but low pressure fan or blower. Preferably the vacuum source is pneumatically connected to one side (here the rear) of the manifold 33, as shown in FIG. 2. A very low level of partial vacuum may be applied, e.g. in the order of 20±5 mm (approximately 1 inch) of water static vacuum in the manifold 33 plenum. To operatively communicate this vacuum for document transporting, it must be provided between the document and the backing or imaging surface 33a. With the present system, as shown in FIGS. 3 and 6, this is accomplished with a large number of small vacuum apertures 53 in the manifold surface 33a. These vacuum apertures 53 here are located in opposite ends of a large number of small vacuum channels 54. The channels 54 and their apertures 53 extend in rows across the surface 33a as shown. These concave hemicylindrical channels 54 extend transversely across the surface 33a in between adjacent belts 35, across the interbelt gaps 35a, but do not extend substantially under the belts. I.e., each channel 54 extends between an aperture 53 under one belt edge only to another aperture 53 under the adjacent edge of the next adjacent belt, but not passing under a belt. The pattern of channels 54 extends across and widely covers the areas of the belt gaps 35a. The apertures 53 are fully covered by the edges of the lower flights of the belts, as shown in FIG. 3. The apertures 53 are not in the interbelt gaps 35a. All but the outer edges of the belts 35 ride on smooth, ungrooved, unapertured, areas of the surface 33a. Only the belt edges are over (end) areas of the vacuum channels 54. Thus, only a relatively small area of the belts 35 are subjected to any vacuum forces here, and consequently there is low frictional drag between the belts and their (predominantly smooth) underlying surface 33a. Yet, when a document sheet is present, the partial vacuum applied to the document from between the belts by the channels 54 is more than sufficient to lift the document up against the belts, and thereby normally hold both up away from the platen surface, and to maintain sufficient normal force between the document and the belts for non-slip feeding by the belts. Although the channels 54 are relatively shallow, they have sufficient cross-sectional area to conduct the requisite relatively low air flow therealong with relatively low resistance, and thereby to relatively uniformly apply the same vacuum level along each channel under the area of the document between the belts 35. Different vacuum levels might be provided in different channels 54, but that is not necessary in the central area of the surface 33a. However a wider interbelt gap 35a may be provided there than elsewhere.

Each row of channels 54 is for pneumatically communicating the partial vacuum from its apertures 52 at each end thereof into one gap 35a between the belts with as little surface 33a perturbation as possible in the gaps 35a, since these gaps 35a are directly exposed to the copier optics. The channels 54 have gently sloping side walls as to be substantially as highly reflective as the rest of the surface 33a and therefore effectively optically invisible. The depth of the channels 54 may be approximately 2 mm, or less. As noted previously, there are provided additional, deeper, rear side channels 58, also transverse to the direction of movement of the belts 35, at the rear edge of the surface 33a. They may be angled to reduce paper edge catching if desired.

While the embodiment disclosed herein is preferred, it will be appreciated from this teaching that various alternatives, modifications, variations or improvments therein may be made by those skilled in the art, which are intended to be encompassed by the following claims:

What is claimed is:

1. In a document handler for presenting documents to the platen of a copier for copying, comprising a vacuum belt platen transport system for feeding the documents over the platen and into an imaging position over the platen, wherein said vacuum belt platen transport system comprises plural document transporting belts movable under a substantially planar vacuum plenum backing and imaging background surface overlying said platen, and vacuum means for applying a partial vacuum to a document sheet being transported by said movable belts over said platen, and means for moving said belts, the improvement comprising:

clamping means for moving said vacuum plenum backing and imaging background surface against said platen to flatten said belts and a document thereon against said platen for copying said document, said clamping means including unclamping means for lifting said vacuum plenum backing and imaging background surface and said belts slightly away from said platen while supplying said partial vacuum with said vacuum means to lift a document away from said platen retained on said belts, for transporting a document with said belts, said unclamping means including means for lifting a first side of said vacuum plenum backing and imaging surface up away from said platen substantially before the opposite side thereof, and then subsequently lifting said opposite side, to generate a controlled air flow for assisting in retaining the document to said belts as said vacuum plenum backing and imaging surface is lifted away from said platen, said means for moving said belts being operable when said vacuum plenum backing and imaging surface is lifted away from said platen and while supplying said partial vacuum with said vacuum means to retain a document against said belts.

2. The document handler of claim 1 wherein said clamping and unclamping means comprises plural cams with different cam rise times connected via cam lifters to lift said first side of said vacuum plenum backing and imaging surface with a different motion than said opposite side by said cams being rotatably driven for clamping and unclamping.

3. The document handler of claim 1 wherein said clamping means moves down said first side of said vacuum plenum backing and imaging surface towards said platen beginning slightly before moving down said opposite side of said vacuum plenum backing and imaging surface towards said platen, to generate a controlled air flow expulsion of air out from under said vacuum plenum backing and imaging surface during clamping.

4. The document handler of claim 2 wherein said clamping means moves down said first side of said vacuum plenum backing and imaging surface towards said platen beginning approximately 5 milliseconds before moving down said opposite side, with further rotation of said same cams, but beginning said movement of said first side before said opposite side with different said cam rise times configurations of said cams, to generate a controlled air flow expulsion of air out from under said vacuum plenum backing and imaging surface during clamping.

5. The document handler of claim 2 wherein said unclamping means, with said rotation of said cams, first lifts said first side of said vacuum plenum backing and imaging surface about 2.5 mm away from said platen while said opposite side remains down in contact with the platen, and then lifts said opposite side about 0.8 mm, and then said vacuum plenum backing and imaging surface is leveled by lifting said opposite side from said about 0.8 mm to about 1.75 mm, and, at approximately the same time, said first side is dropped from said about 2.5 mm to about 1.75 mm.

6. The document handler of claim 2 wherein clamping and unclamping is accomplished by common rotation of said cams with different cam profiles providing said different cam rise times, and wherein after said unclamping is at least partially completed a document previously copied is ejected by said platen transport system and a next document is brought over the platen by said platen transport system, while maintaining said vacuum retention of the documents, and then before the copying of this next document it is clamped against the platen by moving down both said first side and said opposite side of said vacuum plenum backing and imaging surface with further rotation of the same cams but beginning the movement of said first side a fraction of a second before the movement of said opposite side to move said surface down at an angle towards said platen which squeegees out air from under the document before the final clamping, in which both said first and said opposite sides are flattened against said platen.

7. The document handler of claim 1 wherein additional vacuum retention means connecting with said vacuum means are provided along said first edge of said vacuum plenum backing and imaging surface to provide a substantially higher partial vacuum holding force to the edge area of a document overlying said first edge for resisting stripping of the document from said vacuum belt platen transport during said unclamping lifting movement.

8. In a copying method utilizing a document handler for presenting documents to the platen of a copier for copying, comprising a vacuum belt platen transport system for feeding the documents over the platen and into an imaging position over the platen, wherein said vacuum belt platen transport system comprises plural document transporting belts movable under a substantially planar vacuum plenum backing and imaging background surface overlying said platen, and vacuum means for applying a partial vacuum to a document sheet being transported by said movable belts over the platen, and means for moving said belts, the improvement comprising the steps of:

clamping said vacuum plenum backing and imaging background surface against the platen to flatten said belts and a document thereon against the platen for copying said document by unevenly moving said vacuum plenum backing and imaging background surface and said belts down towards said platen, unclamping said vacuum plenum backing and imaging background surface and said belts and a document thereon from said platen by unevenly lifting said surface away from said platen while supplying a partial vacuum with said vacuum means to lift a document away from said platen retained on said belts, said unclamping including lifting a first side of said vacuum plenum backing and imaging surface up away from said platen substantially before the opposite side thereof, and then subsequently lifting said opposite side, to generate a controlled air flow for assisting in retaining the document to said belts as said vacuum plenum backing and imaging surface is lifted away from said platen, and transporting a document with movement of said belts and with said partial vacuum retaining a document against said belts after said unclamping is at least partially completed.

9. The copying method of claim 8 wherein said clamping moves down said first side of said vacuum plenum backing and imaging surface towards said platen beginning slightly before moving down said opposite side of said vacuum plenum backing and imaging surface towards said platen, to generate a controlled air flow expulsion of air out from under said vacuum plenum backing and imaging surface during clamping.

10. The copying method of claim 8 wherein said unclamping first lifts said first side of said vacuum plenum backing and imaging surface about 2.5 mm away from said platen while said opposite side remains down in contact with said platen, and then lifts said opposite side about 0.8 mm, and then said vacuum plenum backing and imaging surface is leveled by lifting said opposite side from said about 0.8 mm to about 1.75 mm, and, at approximately the same time, said first side is dropped from said about 2.5 mm to about 1.75 mm.

11. The copying method of claim 8 wherein said clamping and unclamping is accomplished by rotation of cams with different cam profiles, and wherein after said unclamping is at least partially completed a document previously copied is ejected by said platen transport system and a next document is brought over the platen by said platen transport system, while maintaining said vacuum retention of the documents, and then before the copying of this next document it is clamped against the platen by moving down both said first side and said opposite side of said vacuum plenum backing and imaging surface with further rotation of the same cams but beginning the movement of said first side slightly before said opposite side to move said surface down at an angle towards said platen which squeegees out air from under the document before the final clamping, in which both said first and said opposite sides are flattened against said platen.

* * * * *